(12) United States Patent
Roth et al.

(10) Patent No.: US 11,699,114 B2
(45) Date of Patent: Jul. 11, 2023

(54) AUTOMATED ROBOTIC PRE-STAGING OF PRIORITIZED PICK UP ORDERS FOR NON-NOTIFYING CUSTOMERS OF A RETAIL STORE

(71) Applicant: Walmart Apollo, LLC, Bentonville, AR (US)

(72) Inventors: Brian Roth, Bentonville, AR (US); Paul Durkee, Centerton, AR (US); Jason D. Shaffer, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 112 days.

(21) Appl. No.: 17/392,468

(22) Filed: Aug. 3, 2021

(65) Prior Publication Data
US 2022/0092497 A1    Mar. 24, 2022

Related U.S. Application Data

(60) Provisional application No. 63/081,220, filed on Sep. 21, 2020.

(51) Int. Cl.
*G06Q 10/0631* (2023.01)
*G06Q 10/087* (2023.01)
(Continued)

(52) U.S. Cl.
CPC ....... *G06Q 10/06313* (2013.01); *B65G 1/137* (2013.01); *G06N 5/04* (2013.01);
(Continued)

(58) Field of Classification Search
CPC ............ G06Q 10/087; G06Q 10/0836; G06Q 20/203; G06Q 10/0838; G06Q 10/08; G06Q 30/0635
See application file for complete search history.

(56) References Cited

U.S. PATENT DOCUMENTS

| | | | |
|---|---|---|---|
| 7,725,366 B1 * | 5/2010 | Franco | G06Q 10/08 705/28 |
| 8,001,017 B1 * | 8/2011 | Franco | G06Q 30/0601 705/28 |

(Continued)

OTHER PUBLICATIONS

Oracle Retail Store Inventory Management—Store User Guide Release 16.0 Oracle, Sep. 2018 (Year: 2018).*

(Continued)

*Primary Examiner* — Scott L Jarrett
(74) *Attorney, Agent, or Firm* — Barta, Jones & Foley, PLLC

(57) ABSTRACT

Examples provide a system and method for managing non-notifying customer orders for pickup. An order manager component identifies orders received from customers that typically do not provide advance notification prior to arrival at an order pickup location. A prioritization component assigns a priority to each order based on a per-customer confidence level. Customers providing notification and new customers receive the highest priority. Non-notifying customers having consistent pickup times associated with a threshold minimum number of previous orders receive a second highest priority. Non-notifying customers having inconsistent pickup arrival times and/or fewer than the threshold number of previous orders receive lower priority. A routing schedule is generated for pre-staging the orders based on the assigned priorities, pre-staging area capacity, and/or bot capacity. Totes are moved to the prestaging area based on instructions provided in the routing schedule.

20 Claims, 11 Drawing Sheets

(51) Int. Cl.
*G06N 5/04* (2023.01)
*G06Q 30/0202* (2023.01)
*B65G 1/137* (2006.01)

(52) U.S. Cl.
CPC . *G06Q 10/06311* (2013.01); *G06Q 10/06315* (2013.01); *G06Q 10/087* (2013.01); *G06Q 30/0202* (2013.01); *B65G 2201/0258* (2013.01)

(56) References Cited

U.S. PATENT DOCUMENTS

| | | | | |
|---|---|---|---|---|
| 9,396,451 | B2* | 7/2016 | Waddington | G06Q 30/0633 |
| 9,633,389 | B2* | 4/2017 | Carr | G06Q 10/0836 |
| 10,068,272 | B1* | 9/2018 | Varma | G06Q 30/0633 |
| 10,157,364 | B1* | 12/2018 | Koeppel | G06Q 30/0613 |
| 10,303,171 | B1* | 5/2019 | Brady | G05D 1/0278 |
| 10,489,870 | B2* | 11/2019 | Asaria | G06Q 50/28 |
| 10,657,486 | B1* | 5/2020 | Wolter | G06Q 10/0833 |
| 10,853,871 | B2* | 12/2020 | Smith | G06Q 30/0635 |
| 10,919,701 | B2* | 2/2021 | Lert, Jr. | B65G 1/1378 |
| 11,004,033 | B1* | 5/2021 | Theobald | G05D 1/0223 |
| 11,195,388 | B1* | 12/2021 | Zalewski | G06Q 30/0633 |
| 2002/0032613 | A1* | 3/2002 | Buettgenbach | G06Q 10/08 705/26.8 |
| 2005/0238465 | A1* | 10/2005 | Razumov | G07F 7/00 414/273 |
| 2007/0282618 | A1* | 12/2007 | Barahona | G06Q 10/08355 705/338 |
| 2008/0065500 | A1* | 3/2008 | Foth | G07B 17/00024 705/28 |
| 2013/0262336 | A1* | 10/2013 | Wan | G06Q 10/087 705/339 |
| 2014/0040075 | A1* | 2/2014 | Perry | G06Q 30/0635 705/26.81 |
| 2015/0291357 | A1* | 10/2015 | Razumov | B65G 1/1373 414/807 |
| 2016/0063431 | A1* | 3/2016 | Biswas | G06Q 10/087 705/28 |
| 2016/0210682 | A1* | 7/2016 | Kannan | G06Q 30/0207 |
| 2017/0024805 | A1* | 1/2017 | Tepfenhart, Jr. | G06Q 10/0836 |
| 2017/0116566 | A1* | 4/2017 | Walton | G06Q 10/087 |
| 2017/0147976 | A1* | 5/2017 | Koch | G06Q 10/0833 |
| 2017/0330269 | A1* | 11/2017 | Kanellos | B65G 1/137 |
| 2017/0337523 | A1* | 11/2017 | Roach | G06Q 10/1097 |
| 2018/0127211 | A1* | 5/2018 | Jarvis | G05D 1/0297 |
| 2018/0265295 | A1* | 9/2018 | Beckman | B61L 25/025 |
| 2018/0265296 | A1* | 9/2018 | Beckman | B61D 3/18 |
| 2019/0062055 | A1* | 2/2019 | Hance | G05D 1/021 |
| 2019/0228375 | A1* | 7/2019 | Laury | G05D 1/0088 |
| 2019/0236498 | A1* | 8/2019 | Cantrell | G06Q 30/0603 |
| 2019/0259043 | A1* | 8/2019 | Koneri | G06N 7/01 |
| 2019/0344965 | A1* | 11/2019 | Wilkinson | G07F 11/42 |
| 2019/0347606 | A1* | 11/2019 | Malecha | G06Q 30/0223 |
| 2020/0017297 | A1* | 1/2020 | Mohan | G06Q 50/28 |
| 2020/0242553 | A1* | 7/2020 | Zhang | G06Q 10/0836 |
| 2020/0410994 | A1* | 12/2020 | Burris | G07F 9/009 |
| 2021/0004760 | A1* | 1/2021 | Durkee | G06Q 10/06316 |
| 2021/0065107 | A1* | 3/2021 | Jajula | G06Q 10/087 |
| 2021/0216959 | A1* | 7/2021 | Hapgood | G06Q 30/0639 |
| 2021/0326966 | A1* | 10/2021 | DeLuca | G06Q 30/0637 |
| 2022/0002085 | A1* | 1/2022 | Bellar | G06Q 50/28 |
| 2022/0036295 | A1* | 2/2022 | Lert, Jr. | B66F 9/063 |
| 2022/0092524 | A1* | 3/2022 | Zhou | G06Q 10/06 |
| 2022/0227582 | A1* | 7/2022 | Korge-Hårajuvet | G06Q 10/04 |
| 2022/0306387 | A1* | 9/2022 | Roth | G06Q 50/28 |

OTHER PUBLICATIONS

Oracle—Store Pickup Orders Docs.Oracle.com, Jul. 11, 2015, Retrieved Jan. 17, 2023 (Year: 2015).*

Barry, Brian, How to Implement Store Picking and Curbside Pickup During Cover-19 MultiChannelMerchant, Apr. 28, 2020 (Year: 2020).*

Kim, Thai Young, Improving warehouse responsiveness by job priority management Computers & Industrial Engineering, vol. 139, 2020 (Year: 2020).*

* cited by examiner

| PRE-STAGING AREA 210 | | | |
|---|---|---|---|
| 120A | 120A | 120A | EMPTY |
| EMPTY | 202B | 205C | EMPTY |
| EMPTY | EMPTY | 150D | 150D |

*FIG. 3*

AUTOMATED ROBOTIC PRE-STAGING OF PRIORITIZED PICK UP ORDERS FOR NON-NOTIFYING CUSTOMERS OF A RETAIL STORE

BACKGROUND

Many stores currently provide online ordering of groceries for customer pickup. This enables customers to pick-up groceries or other ordered items without entering the store. In some cases, the ordered items are brought out to the customers car by store personnel. In other cases, the ordered items are dispensed to the customer at a pickup kiosk, pickup counter, drive-through window, curbside pick-up, or other order dispensation portal. Normally, with grocery order pickup, customers are asked to provide twenty to thirty minutes pre-arrival notification that the customer is on their way to pick-up their order. This notification provides time for store personnel or automated order dispensing systems to get order items staged and ready for dispensation. However, some customers routinely do not provide notification prior to arrival. These non-notifying customer orders may not be ready for pickup when the customer arrives, resulting in order dispensing delays, inefficient utilization of order storage space and increased customer wait times.

SUMMARY

Some examples provide a system for managing non-notifying orders for pickup by a user. The system includes at least one processor communicatively coupled to a memory. An automated storage device stores a plurality of items within a plurality of totes associated with a plurality of orders. A set of robotic devices moves a set of totes associated with a selected order from a storage area within the automated storage device to a pre-staging area proximate to an order dispensation area in accordance with pre-staging routing instruction. An order manager component identifies a set of non-notifying orders from a plurality of orders. A prioritization component assigns a priority to each order within the identified set of non-notifying orders based on a per-customer confidence level. A scheduling component generates a routing schedule for pre-staging the set of non-notifying orders based on per-user order history data, confidence level, pre-staging area space capacity, and/or bot capacity. The routing schedule including a set of pre-staging routing instructions for pre-staging each order in the set of non-notifying orders.

Other examples provide a computer-implemented method for managing non-notifying customer orders for pickup. An order manager component identifies a set of non-notifying orders from a plurality of orders, wherein each order is associated with a set of totes storing a set of items within an automated storage device. A prioritization component assigns a priority to each order within the identified set of non-notifying orders based on a per-customer confidence level. A scheduling component generates a routing schedule for pre-staging the set of non-notifying orders based on assigned priorities, pre-staging area space capacity, and bot capacity, the routing schedule including a set of pre-staging routing instructions for pre-staging each order in the set of non-notifying orders. At least one tote is moved from a first location in a storage area to a second location in a pre-staging area based on the pre-staging routing instructions.

Still other examples provide a computer storage media, having computer-executable instructions for managing non-notifying customer orders that, when executed by a computer cause the computer to perform operations. An order manager component identifies a set of non-notifying orders from a plurality of orders, wherein each order is associated with a set of totes storing a set of items within an automated storage device. A prioritization component assigns a priority to each order within the identified set of non-notifying orders based on a per-customer confidence level. A highest priority is assigned to orders originated by new customers. A lowest priority is assigned to orders in the set of non-notifying orders originated by customers having inconsistent previous order pickup arrival times. A second highest priority is assigned to orders in the set of non-notifying orders originated by customers having consistent previous order pickup arrival times and a number of previous orders exceeding a threshold number of previous orders. A scheduling component generates a routing schedule for pre-staging the set of non-notifying orders based on assigned priority, pre-staging area space capacity, and bot capacity. The routing schedule including a set of pre-staging routing instructions for pre-staging each order in the set of non-notifying orders.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an exemplary block diagram illustrating a prestaging area.

Corresponding reference characters indicate corresponding parts throughout the drawings.

DETAILED DESCRIPTION

Figure 1:
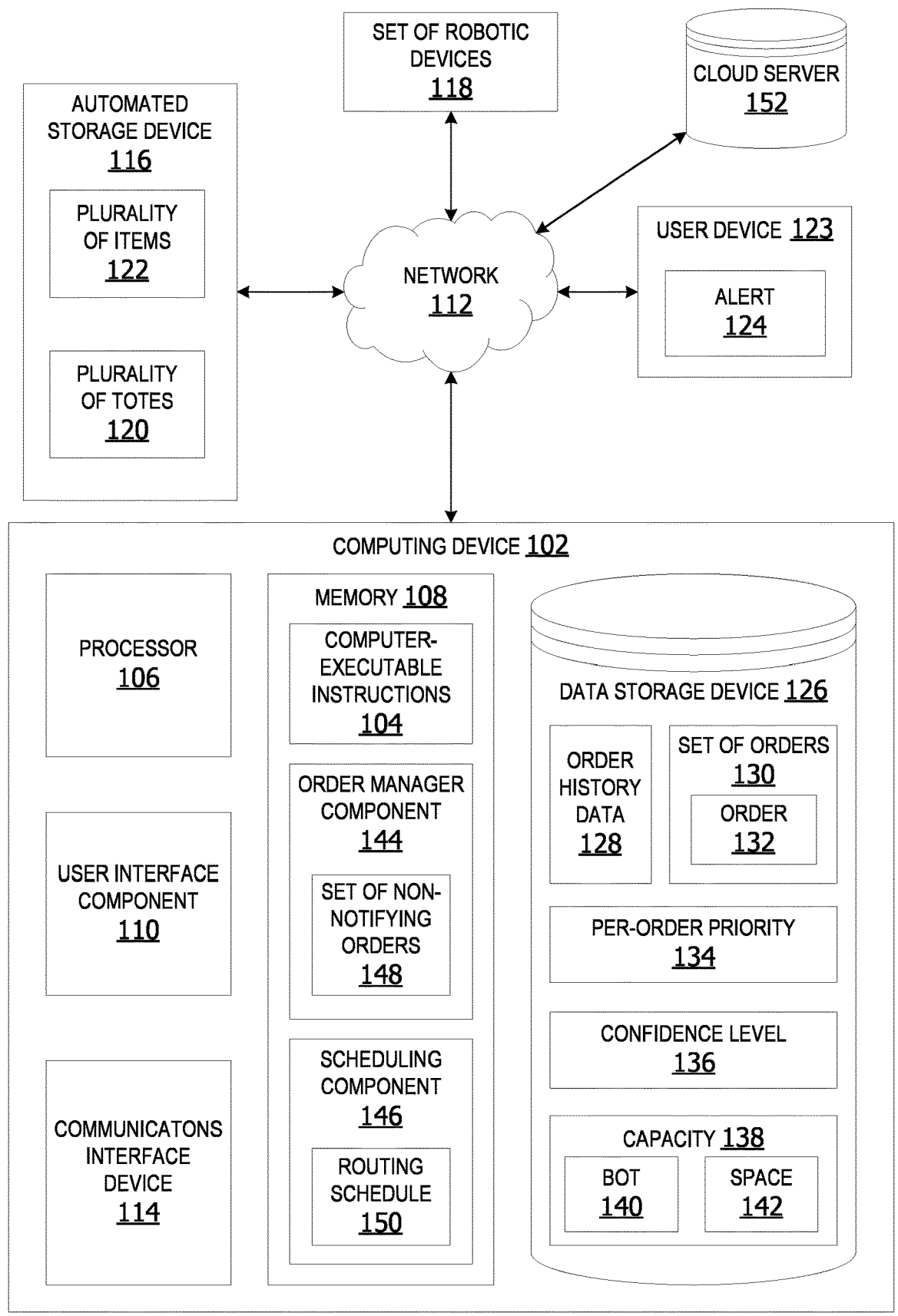
FIG. 1 is an exemplary block diagram illustrating a system for managing non-notifying customer pickup orders.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Referring to the figures, examples of the disclosure enable a system for managing orders originated by non-notifying users. In some examples, the system identifies orders from users that do not typically provide notification prior to arrival at a pickup location to pick up ordered items. The system assigns a priority to each order based on confidence levels. The system predicts pickup time and pre-stages the orders for pickup based on the predicted pickup time and the priority assigned to the orders. The pre-staging reduces customer wait-time for order pickups and improves efficiency of order handling.

Aspects of the examples provide pre-staging of orders without customer check-in by generating a predicted customer pickup time and assigning a priority based on a confidence level for the prediction. This permits pre-staging of orders for pickup by non-notifying customers. The pre-staging permits faster and more efficient order fulfillment with less wait time. The pre-staging further provides smoother customer interaction with the pickup portal interface.

In other examples, the system predicts pickup time by customers failing to check-in prior to arrival. This enables more efficient routing of robotic devices associated with the automated storage system. This reduces mechanical resources and power requirements for the system while further reducing costs associated with operation and maintenance by spreading demand, increasing throughput, and providing more efficient routing and resource allocation based on predicted demand for transfer of totes from main storage to pre-staging areas. In this manner, the system is proactive instead of being reactive for more efficient storage space usage.

Other examples generate a routing schedule for routing robotic devices moving totes within the automated storage system. This enables more effective planning of overall tasks and resource allocation within the system based on more accurate predictions of when and where to move totes for non-notifying customer orders. It further permits stacking, in which a device moving through a given area can be assigned to move tote(s) in the same area to optimize routing and operate with fewer robotic devices.

Referring again to FIG. 1, an exemplary block diagram illustrates a system 100 for managing non-notifying customer pickup orders. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface component 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 6, FIG. 7, FIG. 8, FIG. 9, FIG. 10, and FIG. 11).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown).

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to, an automated storage device 116, a set of robotic devices 118 and/or user device 123, can occur using any protocol or mechanism over any wired or wireless connection. In some examples, the communications interface component 114 is operable with short range communication technologies such as by using near-field communication (NFC) tags.

The automated storage device 116 is an automated storage and retrieval system utilizing a set of one or more robotic devices 118 to move a plurality of totes 120 to storage slots within the automated storage device 116. A tote in the plurality of totes is capable of storing one or more items for fulfilling one or more customer orders for a user. In this example, a plurality of items 122 ordered by a plurality of users (customers) are stored within one or more of the totes in the plurality of totes 120 stored within the automated storage devices.

The user device 123 represents any device executing computer-executable instructions. The user device 123 can be implemented as a mobile computing device, such as, but not limited to, a wearable computing device, a mobile telephone, laptop, tablet, computing pad, netbook, gaming device, and/or any other portable device. The user device 123 includes at least one processor and a memory. The user device 123 can also include a user interface component.

In this example, the user device 123 is a device associated with personnel at an order fulfillment center, such as a grocery store or other order pickup location. In some examples, the user device 123 receives alerts, such as an alert 124 instructing the user to move a set of one or more totes associated with a selected order from a storage location to a staging area in preparation for pickup by the customer originating the order. As used herein, the term "customer originating an order" can refer to the customer that actually made the order, the customer paying for the order, a family member of the customer picking up the order, a third party picking up the order on behalf of the customer that made the order, an agent of the customer, or any other person or party picking up the order for delivery to the customer.

The system 100 can optionally include a data storage device 126 for storing data, such as, but not limited to order history data 128 associated with a set of orders 130, such as, but not limited to, an order 132. The order history data 128 includes data associated with one or more orders made by each customer originating an order in the set of orders 130. The data storage device 126 in some examples, also stores data, such as, but not limited to, per-order priority 134 assigned to each order in the set of orders 130, a confidence level 136 associated with each orders predicted pickup time, and/or capacity 138 associated with the automated storage device 116.

The capacity 138 in some examples refers to bot capacity 140 and/or space 142 available. The bot capacity 140 indicates availability of robotic devices in the set of robotic devices 118. The bot capacity 140 may indicate robotic devices available to move totes during a given time frame and/or areas within the storage area and staging area in which bots are scheduled to move or work at a given time.

The space 142 capacity in other examples refers to available space (tote slots) in the staging area of the automated storage device 116 or other tote storage spaces in other staging area(s) which may be located outside an automated storage device.

The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In other examples, the data storage device 126 includes a database.

The data storage device 126 in this example is included within the computing device 102, attached to the computing device, plugged into the computing device, or otherwise associated with the computing device 102. In other examples, the data storage device 126 includes a remote data storage accessed by the computing device via the network 112, such as a remote data storage device, a data storage in a remote data center, or a cloud storage.

The memory 108 in some examples stores one or more computer-executable components. Exemplary components include an order manager component 144 and/or a scheduling component 146. In some examples, the order manager component identifies a set of non-notifying orders 148 from the set of orders 130. The order manager component 144 assigns the per-order priority 134 to each order based on the order history data 128 and the confidence level 136.

In other examples, the scheduling component 146 generates a routing schedule 150 for staging the set of non-notifying orders based on order history data 128, the confidence level 136, pre-staging area space 142 capacity 138, and/or bot 140 capacity 138. The order history data is order history data for a given user or customer. The history data may be referred to as per-user history data or per-customer history data.

The routing schedule includes a set of routing instructions for pre-staging each order in the set of non-notifying orders within the staging area a predetermined time-interval prior to the originating customers expected arrival time. In this manner, the routing schedule instructs the system as to which totes should be placed into the next available slot in the pre-staging area.

In this example, the order manager component 144 and the scheduling component 146 is implemented within the computing device 102. However, in other examples, the order manager component 144 and the scheduling component 146 are implemented within a cloud associated with a cloud server 152. In such examples, the cloud server 152 generates the routing schedule and sends it to the automated storage device and/or the set of robotic devices via the network 112.

The cloud server 152 is a logical server providing services to the computing device 102 or other clients, such as, but not limited to, the user device 123. The cloud server 152 is hosted and/or delivered via the network 112. In some non-limiting examples, the cloud server 152 is associated with one or more physical servers in one or more data centers. In other examples, the cloud server 152 is associated with a distributed network of servers.

In this example, the order history data associated with users is stored in the data storage device. However, in other examples, the order history data is stored on a cloud storage, such as a storage associated with the cloud storage. In this manner, the order history data is available to the system for order management at multiple remote stores or order pickup locations in the cloud architecture.

Figure 2:
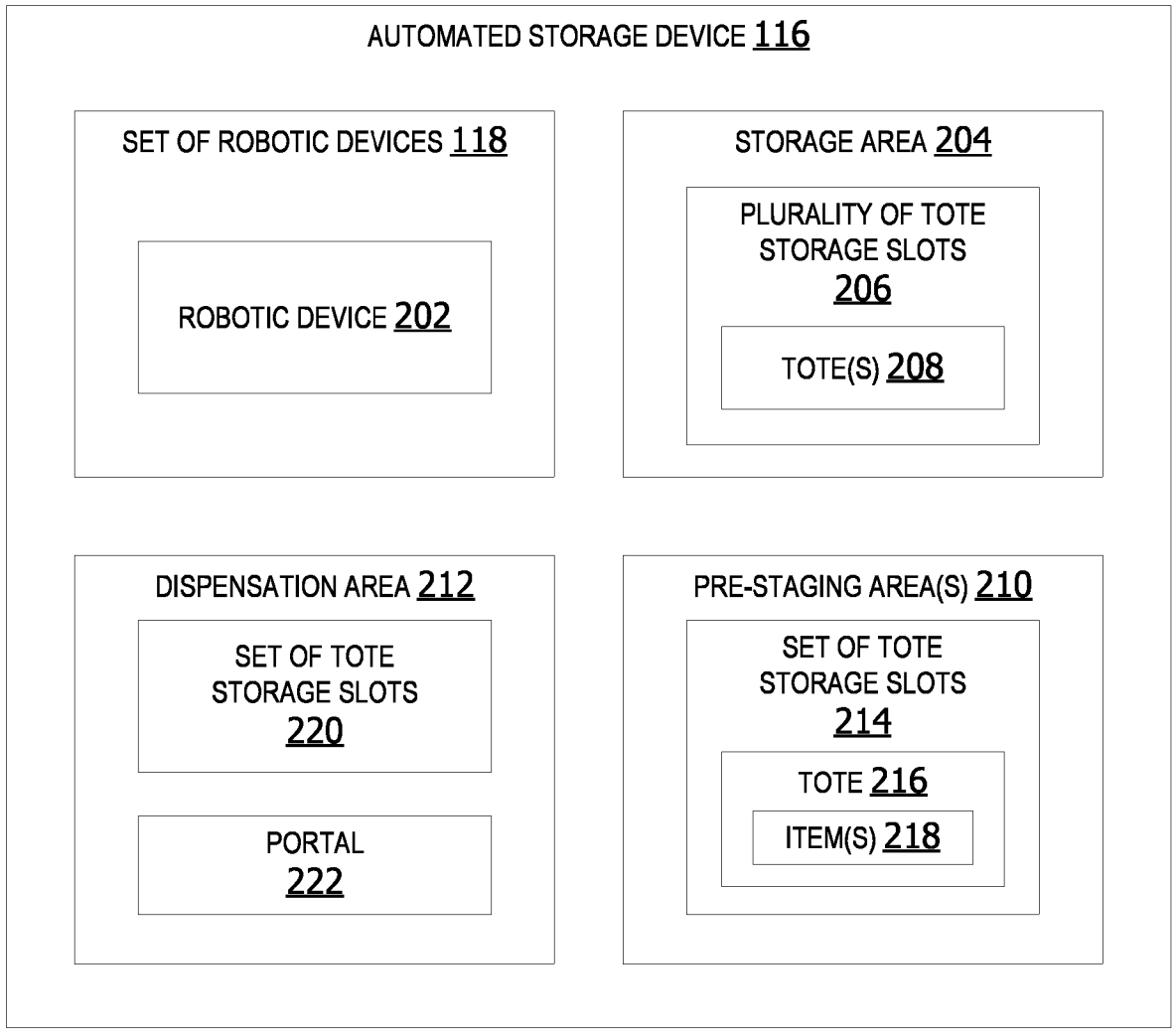
FIG. 2 is an exemplary block diagram illustrating an automated storage device.

FIG. 2 is an exemplary block diagram illustrating an automated storage device 116. In some non-limiting examples, the automated storage device 116 is an environment including a plurality of slots for storing a plurality of totes. A slot may be a space on a shelf, space within a rack, or any other space configured to store a tote.

A tote is a container for storing one or more items. In some non-limiting examples, a tote is a four-sided container having a bottom. The tote may optionally include a top or lid. The top or lid may be completely removably or partially removable. In some examples, the tote may optionally include one or more handles to assist a user in grasping or lifting the tote. In other examples, a tote may include one or more dividers for separating items within the tote. In still other examples, the tote may include insulation to maintain temperature of chilled or frozen items within the tote.

The automated storage device 116 includes a set of robotic devices 118, such as, but not limited to, a robotic device 202. The robotic device 202 may include, for example, but without limitation, robotic arms, conveyors, robotic shuttles, or any other type of robotic or automated devices for moving totes within the storage system.

The automated storage includes one or more main or general storage areas within the automated storage device 116, such as, but not limited to, a storage area 204. The storage area 204 includes a plurality of slots 206 for storing one or more tote(s) 208.

One or more pre-staging area(s) 210 within the automated storage device 116 includes a set of one or more tote storage slots 214 for storing one or more totes, such as, but not limited to, a tote 216. The tote 216 stores one or more item(s) 218 for fulfilling a customer order. Each pre-staging area within the automated storage device 116 is located proximate to a dispensation area 212 for quick and convenient transfer of the totes in the pre-staging area to the dispensation area 212 when a customer arrives to pick up the item(s) 218 within the pre-staged totes.

The dispensation area 212 is an area having a set of one or more tote storage slots 220 and a portal 222. The portal 222 is an order dispensing portal which dispenses ordered items to a customer. The customer interacts with the portal 222 to retrieve their order from the automated storage device 116. In some non-limiting examples, the set of tote storage slots 220 includes six slots for storing up to six totes for dispensing items to the customer (user).

In some examples, totes containing items for a selected order may be stored in scattered locations throughout the storage area 204. For example, but without limitation, an order including three totes of items may have one tote stored on a first level and two of the totes stored on a second or third level within the storage system. During pre-staging, the totes are gathered from the various, disparate locations within the storage system and aggregated together in the pre-staging area.

FIG. 3 is an exemplary block diagram illustrating a prestaging area 210. The pre-staging area 210 includes one or more slots located proximate to a dispensation area. In this non-limiting example, the pre-staging area 210 includes twelve slots for storing a maximum of twelve totes within the pre-staging area 210. However, the examples are not limited to twelve slots. In other examples, the pre-staging area 210 may include any number of slots.

In this non-limiting example, there are four empty slots available for storing totes. In this case, the pre-staging area has an available capacity (available space) of four slots, sufficient to store up to four additional totes into the available empty slots. The pre-staging area includes three slots storing totes for an order number 120A, a slot holding a tote of items for an order number 202B, a slot holding a single tote for an order number 205C, and two slots holding two totes for an order 150D. If a user associated with the order number 120A picks up the items in the three totes labeled 120A from the dispensation area, the pre-staging area 210 will have an additional increased capacity of three more totes corresponding to the three totes storing items for the order number 120A.

Figure 4:
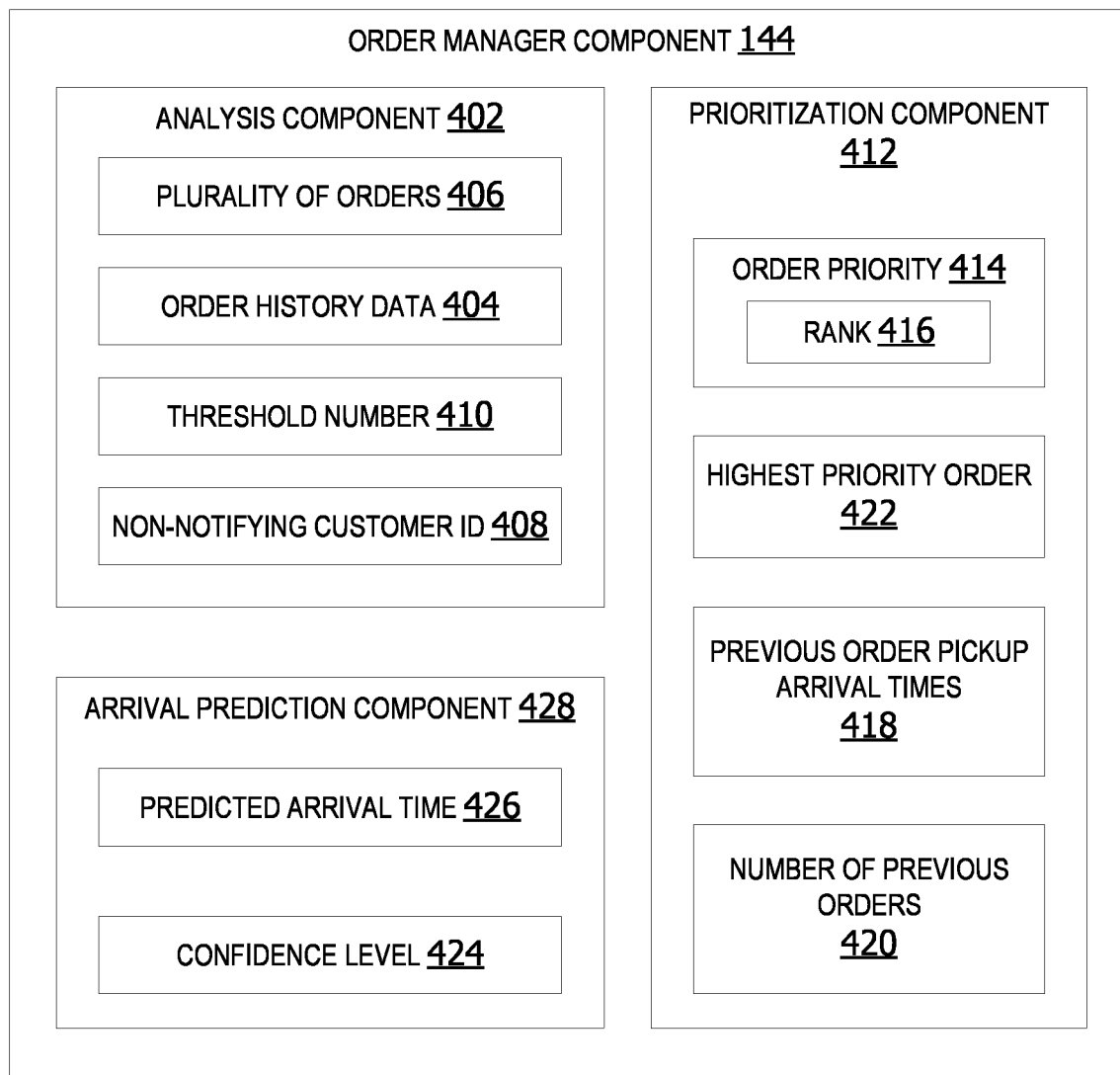
FIG. 4 is an exemplary block diagram illustrating an order manager component.

FIG. 4 is an exemplary block diagram illustrating an order manager component 144. In some examples, the order manager component 144 includes an analysis component 402 analyzing order history data 404 associated with each user originating each order in a plurality of orders 406 being filled/prepared for pickup by the user. The order history data 404 identifies whether the user provided notification prior to arriving at the dispensation portal or other order pickup area to pick up the order, the previous number of orders made by the user, arrival time for each of the previous orders picked up by the user, etc. If the number of previous orders made by the user is equal to or greater than a minimum threshold number 410 of orders, the analysis component 402 is able to make a more accurate non-notifying customer identification (ID) 408 indicating the user is likely to be a non-notifying customer which should be expected to pick up an order without providing notification (check-in) prior to arrival.

The threshold number 410 is the number of previous orders sufficient to make predictions as to future customer pickup time or other order pickup-related behaviors. If the previous pickup times for a customer are very consistent (pickup times within a consistent time interval), the threshold number of orders required for accurate predictions may be a smaller number, such as five previous orders. If there is greater variation in pickup times, the threshold number of previous orders necessary to make accurate pickup time predictions may be higher, such as ten or fifteen previous orders. The threshold number is a user-configurable number.

In other examples, the threshold number is adjusted dynamically by a machine learning component based on real-time order pickup data. The machine learning utilizes pattern recognition and user feedback to dynamically adjust the threshold value for improved prediction accuracy.

A prioritization component 412 in some examples assigns an order priority 414, such as a rank 416, to each order in the plurality of orders 406. The prioritization component 412 assigns priority to an order based on analysis of the order history data 404, previous order pickup arrival times 418 of the user, number of previous orders 420 made by the user, and/or a confidence level 424 for the user. In some examples, if a user provides notification or if the user is a first-time customer (new customer), the user is assigned a highest priority. The new customer is given high priority to ensure the customer's first online order pickup experience is a positive experience with the shortest possible wait time. The highest priority order 422 waiting for pre-staging is moved to the pre-staging area prior to lower priority orders.

In some examples, the pre-staging area is an area within the storage device that is proximate to (near) the dispensation area where order items are dispensed to a customer. In other examples, the pre-staging area is an area near/proximate to a pickup counter, pickup portal, pickup tower/kiosk, or other area where orders are dispensed to the customer. In other examples, the pre-staging area is any open/available storage space closest to the dispensation area. If areas immediately adjacent the dispensation area are full, the next closest area to the dispensation area which is unoccupied (available) is the pre-staging area.

In some non-limiting examples, the confidence level 424 is a ranking or percentage value indicating a level in confidence in a predicted arrival time 426 based on the number of previous orders 420, which is the sample size, and the previous order pickup arrival times 418. For example, if there is a large sample size (a number of previous orders exceeding the minimum threshold) or high consistency in previous pickup times, the confidence level may be a high confidence, such as ninety-five percent. In such cases, a higher priority is assigned. If there are fewer previous orders or more diverse pickup times, the confidence level may be lower, such as, seventy percent or sixty percent. In such cases, a lower priority is assigned.

If the previous arrival times are consistent, there is a higher confidence level 424. If the user has historically arrived at very different arrival times to pick up previous orders, the confidence level is lower due to increased unpredictability of the user behavior arriving at different times.

In some examples, an arrival prediction component 428 generates a predicted arrival time 426 for the non-notifying customer. The predicted arrival time 426 may be a discrete time, such as, 2:15 p.m. or 9:30 am. The predicted arrival time in other examples is a time interval, such as, but limited to, 2:00 p.m. to 2:15 p.m. or any other time interval.

In this non-limiting example, the totes for a given order are stored contiguously, in slots adjacent to each other. However, the examples are not limited to storing all the totes for a single order together in a set of contiguous slots. All the totes for a given order are moved to the pre-staging order at the same time, but the totes do not have to be stored in contiguous slots within the pre-staging area. The totes may be stored in non-contiguous/non-adjacent slots within the pre-staging area.

In this example, all the slots in the pre-staging area are contiguous or adjacent. However, in other examples, the slots in the pre-staging area may be scattered around the dispensation area. The totes placed in the pre-staging area are closer to the dispensation portal, which reduces time required to move the totes into the dispensation portal. Retrieving scattered totes located throughout the storage system can take seconds or even several minutes. In some examples, pre-staging reduces the time it takes to move ordered items into the portal for pickup by customers from thirty to sixty seconds or more.

Figure 5:
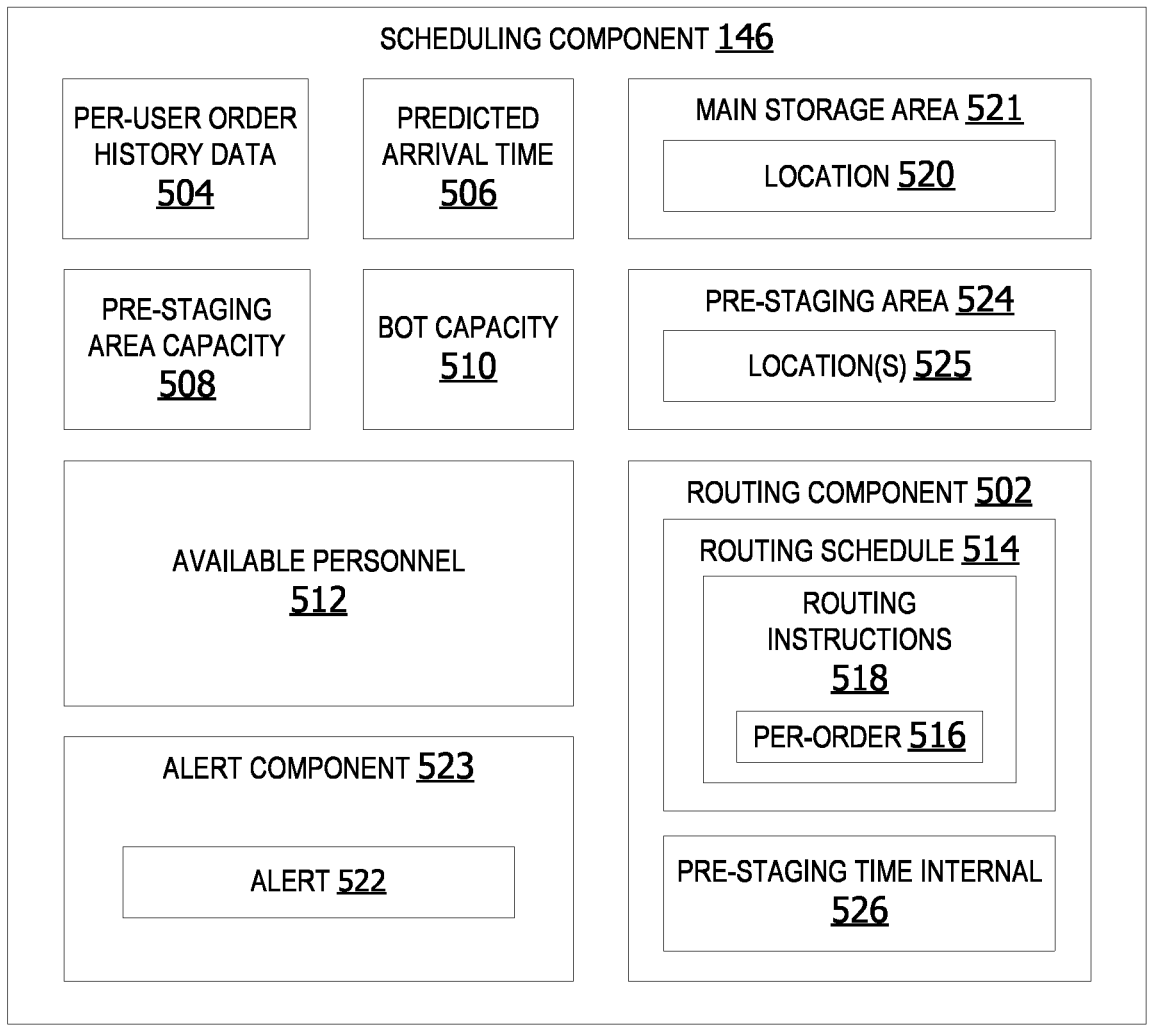
FIG. 5 is an exemplary block diagram illustrating a scheduling component.

FIG. 5 is an exemplary block diagram illustrating a scheduling component 146. A routing component 502 utilizes the per-user history data 504, predicted arrival time 506 of the customer for each order, pre-staging area capacity 508 identifying the number of available (empty) slots and location of available slots in the pre-staging area, bot capacity 510 and/or available personnel 512. The available personnel indicates manpower or available (unallocated) time for personnel to move totes from the main storage area to the pre-staging area outside an automated storage device.

In some examples, the routing component 502 generates a routing schedule 514, including per-order 516 routing instructions 518 for routing robotic devices in the set of robotic devices to move order totes for non-notifying customer pickup orders from locations 520 in the main storage area 521 to one or more location(s) 525 in a pre-staging area 524. In some examples, the routing schedule 514 instructs the robotic devices to move the tote(s) storing items for fulfilling a given order to the pre-staging area within a pre-staging time interval 526. The pre-staging time interval 526 is a time period or time range beginning a pre-determined time before the predicted arrival time 506 of the user to pick-up the order.

In other examples, where the order totes are stored outside an automated storage device, such as in a storeroom or other temporary storage area, an alert component 523 sends an alert 522 to a user device, such as, but not limited to, the user device 123 in FIG. 1. The alert 522 instructs a user (personnel) to move totes storing items for fulfillment of a non-notifying customer pickup order from the main storage area 521 to the pre-staging area 524 prior to the predicted arrival time 506.

In this example, the order priority is utilized to determine when to move the totes for a given order into pre-staging area(s). However, in other examples, the priority can also be used for prioritizing order picking. For example, items for fulfilling orders having a higher priority are picked by personnel and placed into totes for induction into the automated storage device prior to picking of lower priority orders. Likewise, the priority can be used to determine when to induct order totes into the automated storage device. In such cases, orders having a higher priority are inducted into the system before lower priority orders.

In some non-limiting examples, if a customer checks-in after an order has already been pre-staged to provide a later pickup time than the predicted pickup time, the system can either leave the totes associated with that order in the pre-staging area or move the order totes out of the pre-staging area to free up space for other higher priority order totes. In other examples, the system determines whether to move totes out of pre-staging after check-in provides a later pickup time based on cold-chain compliance associated with any chilled or frozen items, available space (capacity) in the pre-staging area, and whether higher priority orders are waiting for space in the prestaging area.

Figure 6:
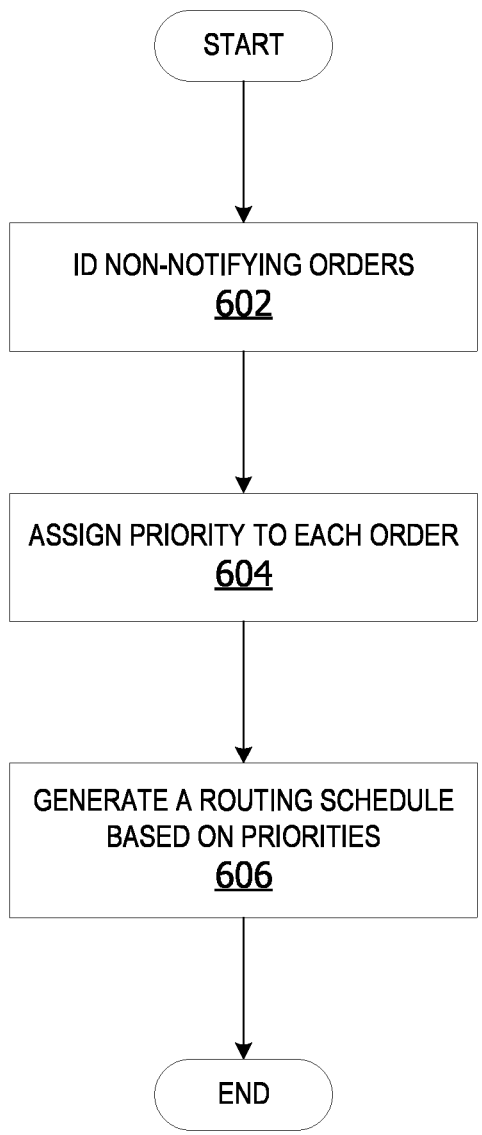
FIG. 6 is an exemplary flow chart illustrating operation of the computing device to generate a routing schedule.

FIG. 6 is an exemplary flow chart illustrating operation of the computing device to generate a routing schedule. The process shown in FIG. 6 is performed by an order manager component, executing on a computing device, such as the computing device 102 or the user device 123 in FIG. 1.

The process begins by identifying non-notifying orders at 602. The non-notifying orders are orders made by customers or other users that do not provide notification (pre-pickup check-in) prior to arrival at an order pickup location. A non-notifying order can include an order, such as, but not limited to, an order in the set of non-notifying orders 148 in FIG. 1. The order manager component assigns a priority to each order at 604. The priority indicates a ranking or prioritization for pre-staging orders. The priority may be an order priority assigned to an order, such as, but not limited to, the per-order priority 134 in FIG. 1. A scheduling component generates a routing schedule based on the priorities at 606. The routing schedule may include instructions for directing robotic devices to move order totes and/or a schedule for sending alerts to a user device instructing a user to manually move order totes, such as, but not limited to, the routing schedule 150 in FIG. 1. The process terminates thereafter.

The process shown in FIG. 6 may be performed by a computing device as described above. However, in other examples, the process may be implemented in a cloud. In addition, one or more computer-readable storage media storing computer-readable instructions may execute to cause at least one processor to implement the operations illustrated in FIG. 6.

Figure 7:
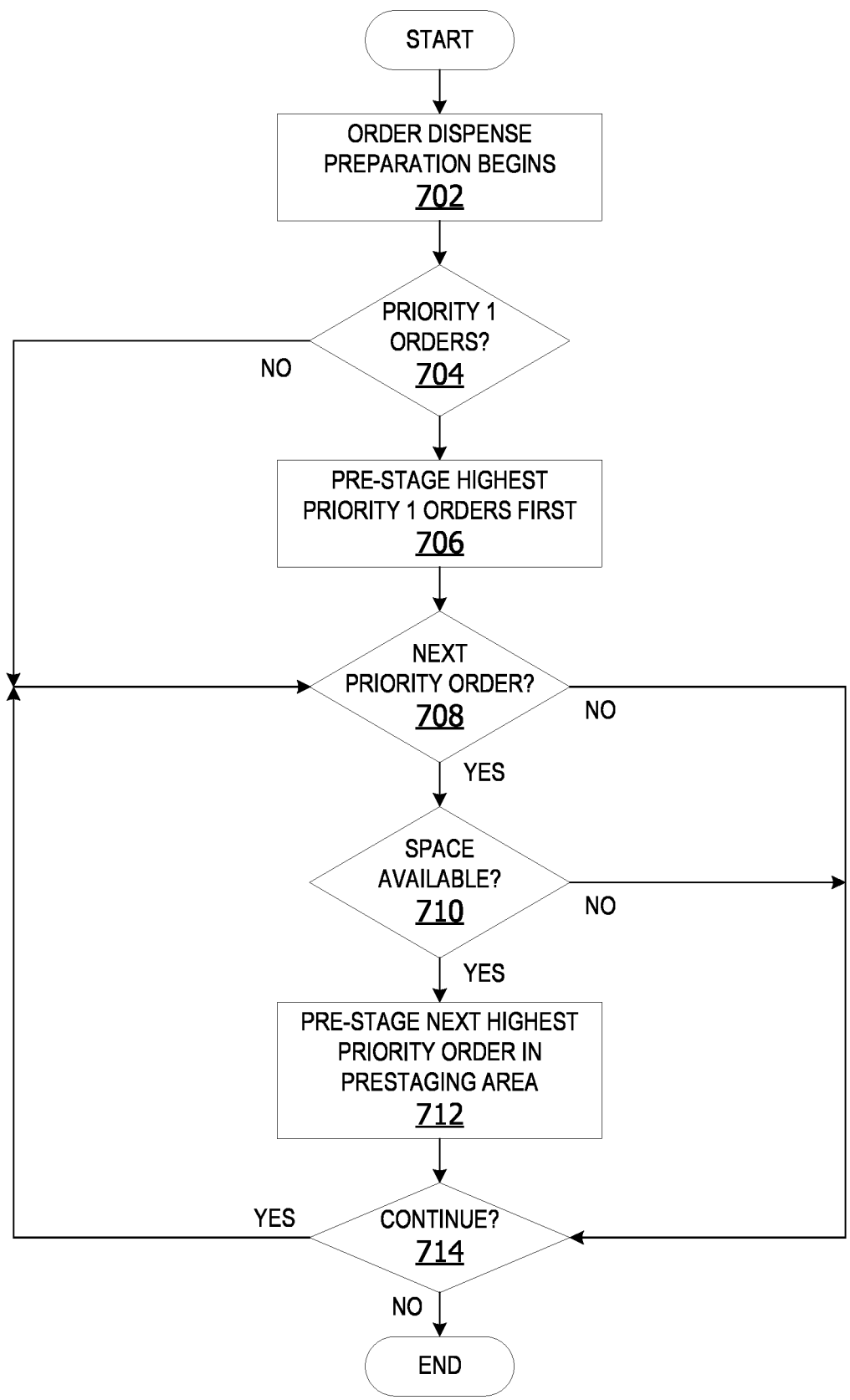
FIG. 7 is an exemplary flow chart illustrating operation of the computing device to pre-stage orders in accordance with an order priority.

FIG. 7 is an exemplary flow chart illustrating operation of the computing device to pre-stage orders in accordance with an order priority. The process shown in FIG. 7 is performed by a scheduling component, executing on a computing device, such as the computing device 102 or the user device 123 in FIG. 1.

The order dispense preparation begins at 702. The scheduling component determines whether there are any highest priority (priority 1) orders ready to move to the pre-staging area at 704. If yes, the priority 1 orders are moved to the pre-staging area first before lower priority orders at 706. The scheduling component determines whether a next highest priority order is ready for pre-staging at 708. A next highest priority order could include a second highest priority (priority 2). If yes, a determination is made whether space is available in the pre-staging area at 710. The pre-staging area is an area proximate or adjacent to the dispensation area, such as, but not limited to, the pre-staging area 210 in FIG. 2. If yes, the next highest priority order is pre-staged by moving the totes to the pre-staging area at 712. A determination is made whether to continue at 714. If yes, the process iteratively executes operations 702 through 714. If a determination is made to discontinue at 714, the process terminates.

The process shown in FIG. 7 may be performed by a computing device as described above. However, in other examples, the process may be implemented in a cloud. In addition, one or more computer-readable storage media storing computer-readable instructions may execute to cause at least one processor to implement the operations illustrated in FIG. 7.

Figure 8:
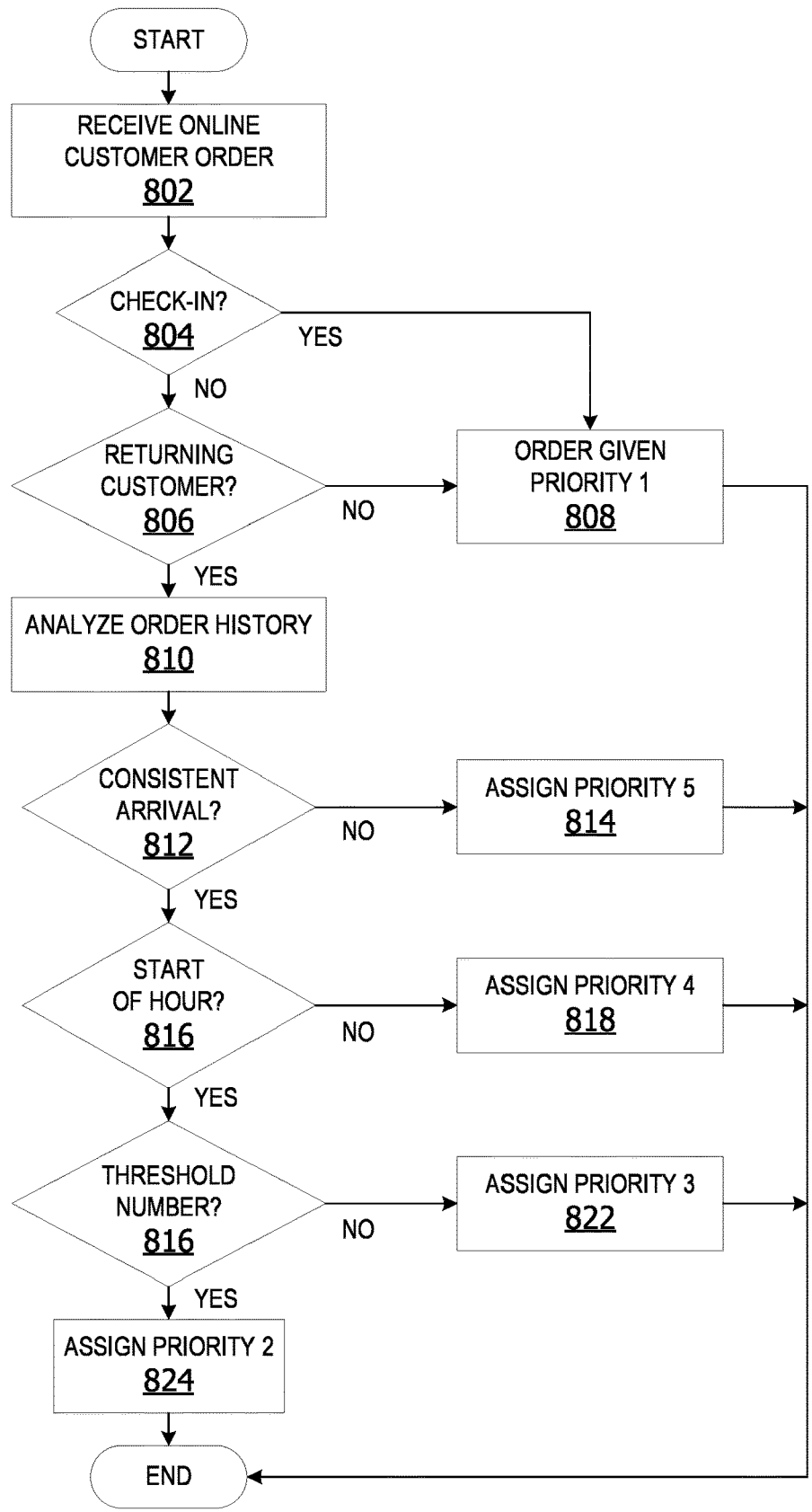
FIG. 8 is an exemplary flow chart illustrating operation of the computing device to assign a priority to orders.

FIG. 8 is an exemplary flow chart illustrating operation of the computing device to assign a priority to orders. The process shown in FIG. 8 is performed by an order manager component, executing on a computing device, such as the computing device 102 or the user device 123 in FIG. 1.

The process begins by receiving an online customer order at 802. The online order may be received from an application on a user device, such as, but not limited to, the user device 123 in FIG. 1. A determination is made whether the user has checked-in at 804. If yes, the order is given a priority 1 (highest priority) ranking at 808. If there is no check-in, the order manager component determines if this is a returning customer at 806. A returning customer is a user that has made a previous online order. If no, the customer is a new customer. The new customer order is given a priority 1 (highest priority) at 808.

If the customer is a returning customer, the customer's order history for previous orders is analyzed at 810. The analysis may be performed by an analysis component, such as, but not limited to, the analysis component 402 in FIG. 4. A determination is made whether the customer's previous arrival times are consistent at 812. If no, a low priority (priority 5) is assigned to the order at 814. If the arrival times for previous order pickups are consistent, a determination is made whether the arrival times are at the start of the hour at 816. If no, a priority 4 is assigned at 818. If the arrival time is at the start of the hour, a determination is made whether there are a threshold number of previous orders at 820. If no, the order is assigned a priority 3 at 822. If the order history does include information for a threshold number of previous orders to give a higher confidence in the predicted pickup time, the order manager component assigns a priority 2 (second highest) to the order at 824. The process terminates thereafter.

The process shown in FIG. 8 may be performed by a computing device as described above. However, in other examples, the process may be implemented in a cloud. In addition, one or more computer-readable storage media storing computer-readable instructions may execute to cause at least one processor to implement the operations illustrated in FIG. 8.

Figure 9:
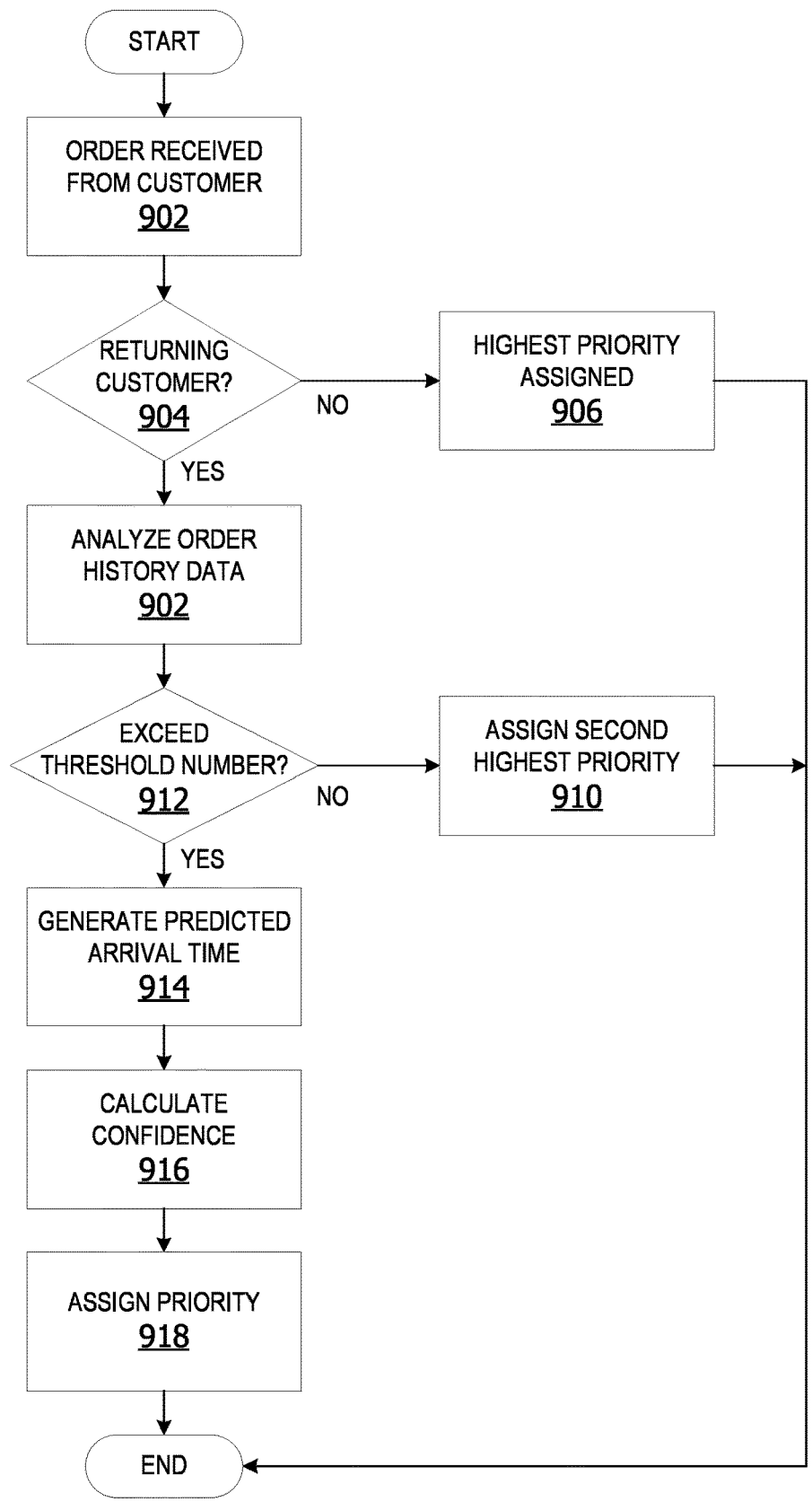
FIG. 9 is an exemplary flow chart illustrating operation of the computing device to generate predicted arrival time, confidence level and priority for orders.

FIG. 9 is an exemplary flow chart illustrating operation of the computing device to generate predicted arrival time, confidence level and priority for orders. The process shown in FIG. 9 is performed by an order manager component, executing on a computing device, such as the computing device 102 or the user device 123 in FIG. 1.

The process begins when an order is received from a customer at 902. A determination is made whether the user originating the order is a returning customer at 904. If no, a highest priority is assigned to the order 906. The highest priority is given to new customers and customers that check-in. If the user is not a returning customer, the order manager component analyzes order history data at 908. A determination is made whether the number of previous orders for the customer exceeds a threshold number at 912. If no, a second highest priority is assigned to the order at 910.

Returning to 912, if the number of previous orders does exceed the threshold number, the order manager component generates a predicted arrival time 914 of the customer. A confidence level is calculated at 916. The confidence level indicates a degree of confidence in a predicted arrival time for a non-notifying customer based on the number of previous orders for the customer and/or the consistency of the customer's previous arrival times. The order management component assigns a priority to the order at 918. The process terminates thereafter.

The process shown in FIG. 9 may be performed by a computing device as described above. However, in other examples, the process may be implemented in a cloud. In addition, one or more computer-readable storage media storing computer-readable instructions may execute to cause at least one processor to implement the operations illustrated in FIG. 9.

Figure 10:
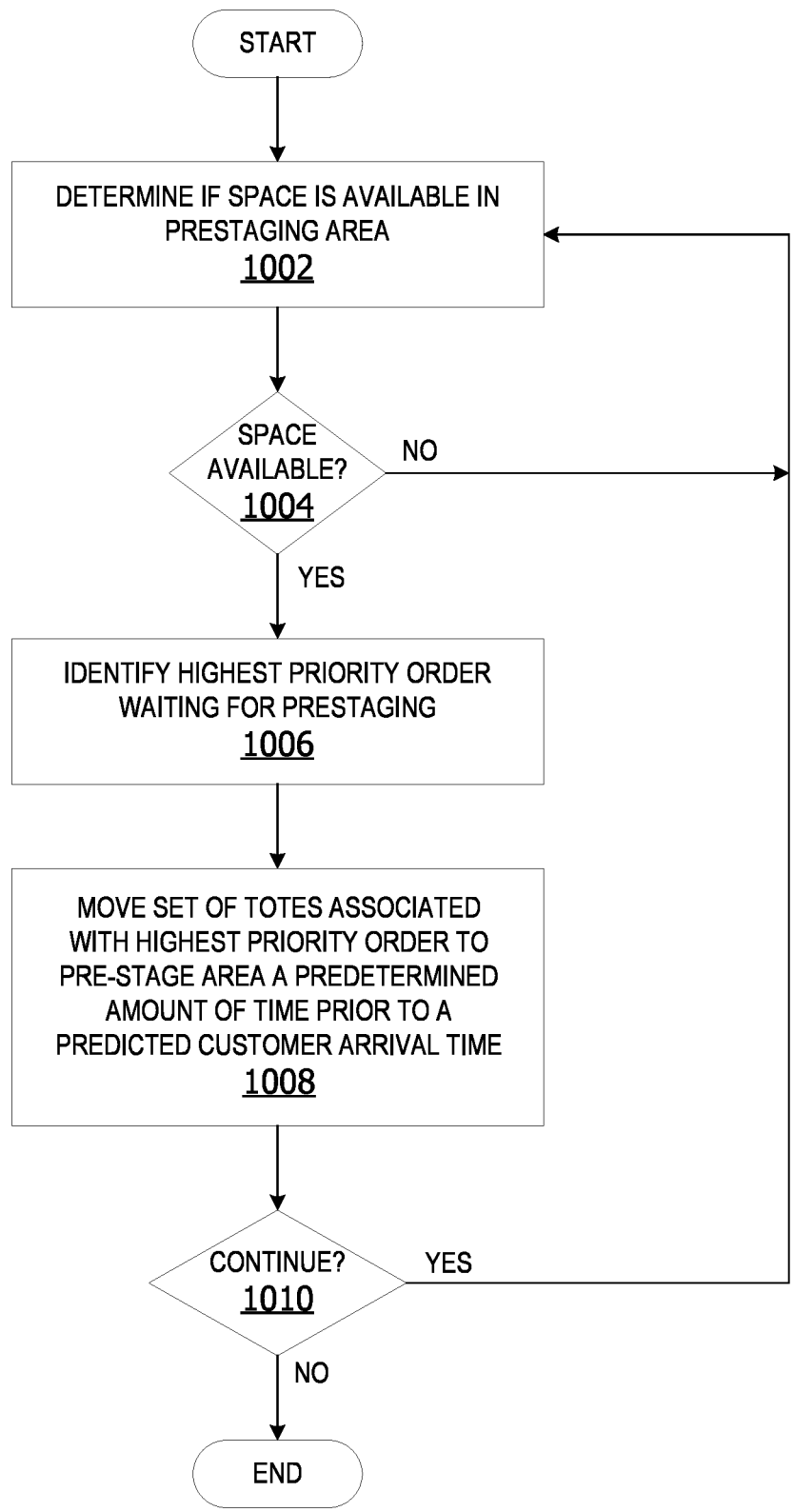
FIG. 10 is an exemplary flow chart illustrating operation of the computing device to move totes to a pre-stage area prior to a predicted arrival time.

FIG. 10 is an exemplary flow chart illustrating operation of the computing device to move totes to a pre-stage area prior to a predicted arrival time. The process shown in FIG. 10 is performed by a scheduling component, executing on a computing device, such as the computing device 102 or the user device 123 in FIG. 1.

The process begins by determining if space is available in a prestaging area at 1002. A determination is made as to whether space is available at 1004. If yes, a highest priority order waiting for pre-staging is identified at 1006. A set of totes associated with the highest priority order to pre-stage area a predetermined amount of time prior to a predicted customer arrival time at 1008. A determination is made whether to continue at 1010. If yes, the process iteratively executes operations 1002 through 1010. If a determination is made to discontinue at 1010, the process terminates.

The process shown in FIG. 10 may be performed by a computing device as described above. However, in other examples, the process may be implemented in a cloud. In addition, one or more computer-readable storage media storing computer-readable instructions may execute to cause at least one processor to implement the operations illustrated in FIG. 10.

Figure 11:
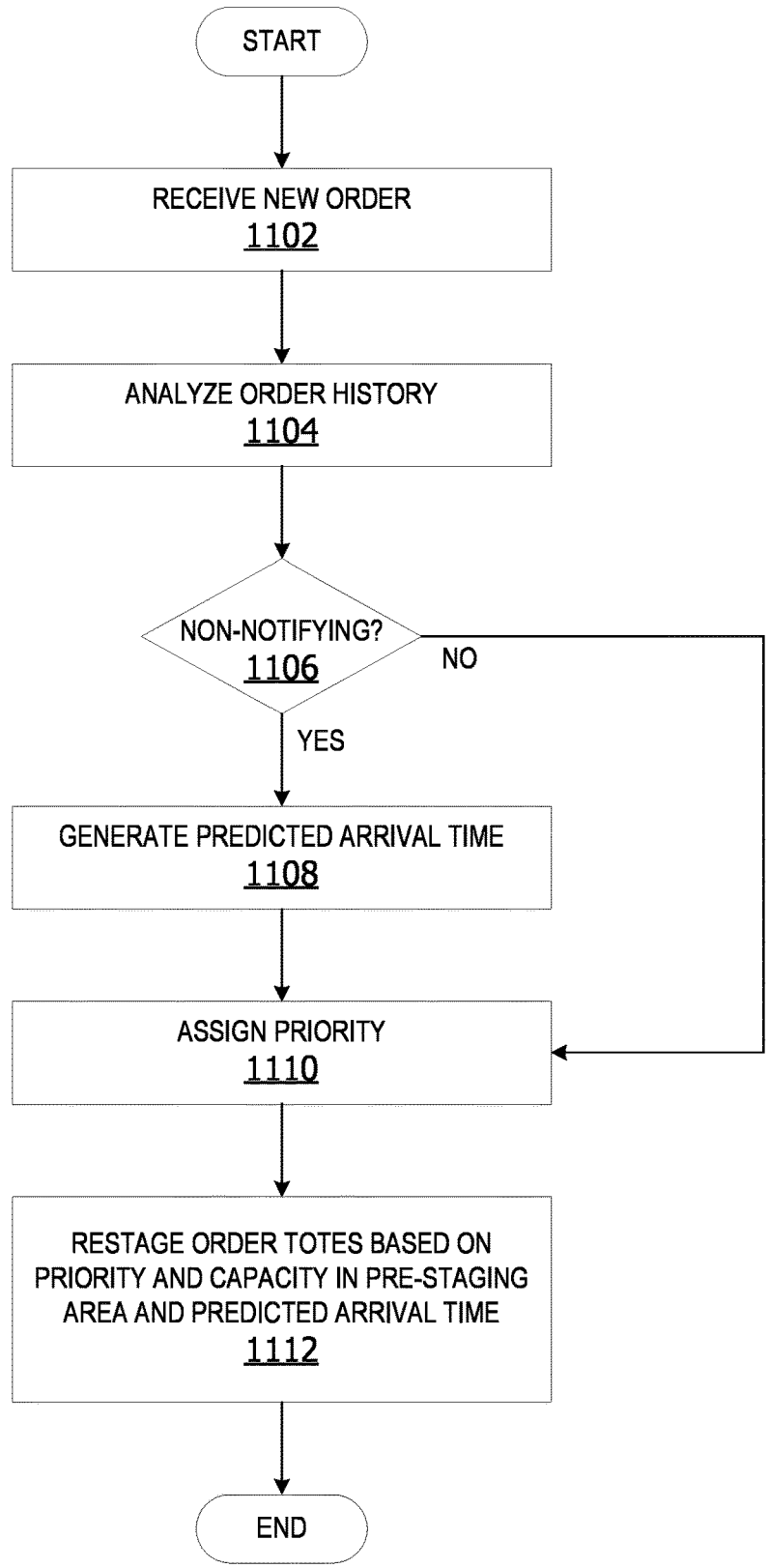
FIG. 11 is an exemplary flow chart illustrating operation of the computing device to manage non-notifying customer orders based on priorities, capacity, and predicted arrival time of customers.

FIG. 11 is an exemplary flow chart illustrating operation of the computing device to manage non-notifying customer orders based on priorities, capacity, and predicted arrival time of customers. The process shown in FIG. 11 is performed by an order manager component, executing on a computing device, such as the computing device 102 or the user device 123 in FIG. 1.

The process begins by receiving a new order at 1102. Order history is analyzed at 1104. A determination is made whether it is a non-notifying customer order at 1106. If yes, a predicted arrival time is generated at 1108. The predicted arrival time may be determined based on the customer's previous order pickup arrival times associated with previous orders by the customer. A priority is assigned to the order at 1110. The order totes for the order are pre-staged based on priority, capacity in the pre-staging area and predicated arrival time at 1112. The process terminates thereafter.

The process shown in FIG. 11 may be performed by a computing device as described above. However, in other examples, the process may be implemented in a cloud. In addition, one or more computer-readable storage media storing computer-readable instructions may execute to cause at least one processor to implement the operations illustrated in FIG. 11.

Additional Examples

In some examples, the order management system is integrated with automation devices that build customer orders. The system in some examples utilizes robotic devices in online order building automation without user notification (check-in) prior to order pickup. The system prioritizes order types based on customer behavior and interactions associated with previous (past) orders. The system starts preparing orders for dispense or delivery to the customer when they arrive on site without check-in while reducing customer wait time during order dispensing.

In other examples, the system utilizes order history, including previous customer behaviors, to estimate when the customer is predicted to arrive based on past order pickup times. If the customer arrives in last fifteen minutes of an hour during a threshold number of orders. In one example, the threshold number of orders is five orders. In other examples, the threshold number of orders is ten orders. If the customer consistently picks up orders during the last fifteen minutes of an hour, the system can generate a predicted order pickup time in the last fifteen minutes of the hour during which the customer is expected to arrive. When the predicted pickup time is approaching (within a predetermined time prior to the predicted pickup time), the system starts pulling those orders to a pre-staging area to streamline total time to dispense to the customer. It is integrating software prioritization inside the system operational capabilities to improve the user experience.

In an example scenario, an order for a new customer is given the highest priority. If the order is a returning customer's second or third order, there may not be sufficient historical pickup data to predict a pickup time. Moreover, the customer on a second order is still relatively new to using the online order pickup system. Therefore, in some examples, the order is given a second highest priority.

In some examples, the system uses known customer pickup habits to identify those who do not send arrival notifications. These non-notifying customer orders are staged for quick retrieval. Customers with a history of not checking in, but also a history of being consistent, can be flagged to pre-stage the order to speed the dispensation and minimize idle time. For the customer who doesn't check in, order items can be moved to a storage location (instead of the dispensation area) in order to speed the dispensation process once non-notifying customers arrive.

In other examples, the system identifies customers for pre-staging by taking into consideration customers who don't check in but are consistently a fixed amount of time early or late. The determination is calculated based on a most recent "n" number of visits. In cases where space is limited, a ranking is determined based on confidence level. The confidence metric is used to allocate the space for staging no-check-in (non-notifying) customers. Additional capacity considerations: both space capacity and bot capacity are considerations in ranking the most confident to least confident for prioritizing the orders of non-notifying customers.

In one example, the system identifies pre-stage customers that are non-notifying (no-check-in) customers consistent at picking up orders within a predetermined timeframe (pickup window) based on pickup times in a previous "N" number of order pickup visits. Orders are pre-staged for quick retrieval in accordance with a ranking (priority) if limited space in pre-staging area. The system assigns a ranking or priority based on the per-customer confidence level, storage area (staging area) space capacity, bot capacity and/or available manpower for moving totes.

Alternatively, or in addition to the other examples described herein, examples include any combination of the following:
  an analysis component, implemented on the at least one processor, analyzes per-customer order history data associated with a customer originating an order in the plurality of orders to determine whether the customer is a returning customer or a new customer, wherein the prioritization component assigns a highest priority to orders originated by new customers;
  wherein the prioritization component assigns a second highest priority to an order in the plurality of orders originated by a customer having a number of previous orders which is less than a threshold number of previous orders;
  an analysis component, implemented on the at least one processor, analyzes order data associated with the plurality of orders to identify a set of non-notifying customers consistently failing to provide advance notification prior to order pickup for a threshold number of orders;
  wherein the prioritization component analyzes order history data associated with a set of previous orders to identify a set of previous arrival times associated with the set of previous orders, wherein the set of previous orders exceeds a threshold number of previous orders;
  the prioritization component assigns a priority to a current non-notifying customer order waiting for pickup based on the set of previous arrival times;
  an arrival prediction component, implemented on the at least one processor, generates a predicted arrival time for a customer originating an order in the identified set of non-notifying orders based on a set of previous arrival times associated with a previous set of orders picked up by the customer;
  an arrival prediction component, implemented on the at least one processor, generates the confidence level associated with a predicted arrival time for a customer pickup of an order based on a number of previous orders associated with the customer originating the order in the identified set of non-notifying orders;
  a routing component, implemented on the at least one processor, generates a set of routing instructions for each order in the set of non-notifying orders;
  the set of routing instructions including instructions for routing one or more robotic devices moving a set of totes from a first location within the main storage area into a second location within the pre-staging area;
  an alert component, implemented on the at least one processor, sends an alert notifying a user to move a set of totes associated with at least one order in the set of non-notifying orders from a first location within a main storage area to a second location within a pre-staging area;
  identifying, by an order manager component, a set of non-notifying orders from a plurality of orders, wherein each order is associated with a set of totes storing a set of items within an automated storage device;
  assigning, by a prioritization component, a priority to each order within the identified set of non-notifying orders based on a per-customer confidence level;
  generating, by a scheduling component, a routing schedule for pre-staging the set of non-notifying orders based on assigned priorities, pre-staging area space capacity, and bot capacity, the routing schedule including a set of pre-staging routing instructions for pre-staging each order in the set of non-notifying orders;

wherein at least one tote from a first location in a storage area to a second location in a pre-staging area based on the pre-staging routing instructions;

pre-staging, by a set of robotic devices, a set of totes associated with a selected order from a set of location within the storage area within the automated storage device to a set of locations within the pre-staging area proximate to an order dispensation area in accordance with the pre-staging routing instruction;

analyzing, by an analysis component, per-customer order history data associated with a customer originating an order in the plurality of orders to determine whether the customer is a returning customer or a new customer;

assigning, by a prioritization component, the highest priority to orders originated by new customers;

assigning the lowest priority to an order in the set of non-notifying orders originated by a customer having inconsistent previous order pickup arrival times;

assigning a second highest priority to an order in the plurality of orders originated by a customer having a number of previous orders which is less than the threshold number of previous orders;

analyzing order history data associated with a set of previous orders to identify a set of previous arrival times associated with the set of previous orders, wherein the set of previous orders exceeds a threshold number of previous orders;

assigning a priority to a current non-notifying customer order waiting for pickup based on the set of previous arrival times;

routing, by a routing component, one or more robotic devices moving a set of totes from a first location within the main storage area into a second location within the pre-staging area;

sending, by an alert component, an alert notifying a user to move a set of totes associated with at least one order in the set of non-notifying orders from a first location within a main storage area to a second location within a pre-staging area;

identifying, by an order manager component, a set of non-notifying orders from a plurality of orders, wherein each order is associated with a set of totes storing a set of items within an automated storage device;

assigning, by a prioritization component, a priority to each order within the identified set of non-notifying orders based on a per-customer confidence level;

wherein a highest priority is assigned to orders originated by new customers;

a second highest priority is assigned to orders originated by customers having consistent previous order pickup arrival times and a number of previous orders exceeding a threshold number of previous orders;

wherein a lowest priority is assigned to orders in the set of non-notifying orders originated by customers having inconsistent previous order pickup arrival times;

generating, by a scheduling component, a routing schedule for pre-staging the set of non-notifying orders based on assigned priority, pre-staging area space capacity, and bot capacity;

the routing schedule including a set of pre-staging routing instructions for pre-staging each order in the set of non-notifying orders;

routing, by a routing component, one or more robotic devices moving a set of totes from a first location within the main storage area into a second location within the pre-staging area; and sending, by an alert component, an alert notifying a user to move a set of totes associated with at least one order in the set of non-notifying orders from a first location within a main storage area to a second location within a pre-staging area.

At least a portion of the functionality of the various elements in FIG. 1, FIG. 2, FIG. 3, FIG. 4, and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4, and FIG. 5.

In some examples, the operations illustrated in FIG. 6, FIG. 7, FIG. 8, FIG. 9, FIG. 10, and FIG. 11 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing non-notifying customer orders, the method comprising identifying a set of non-notifying orders from a plurality of orders, wherein each order is associated with a set of totes storing a set of items within an automated storage device; assigning a priority to each order within the identified set of non-notifying orders based on a per-customer confidence level; and generating a routing schedule for pre-staging the set of non-notifying orders based on assigned priorities, pre-staging area space capacity, and bot capacity; and pre-staging each order in the set of non-notifying orders.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for managing non-notifying customer orders. For example, the elements illustrated in FIG. 1, FIG. 2, FIG. 3, FIG. 4 and FIG. 5, such as when encoded to perform the operations illustrated in FIG. 6, FIG. 7, FIG. 8, FIG. 9, FIG. 10 and FIG. 11, constitute exemplary means for identifying a set of non-notifying orders from a plurality of orders; exemplary means for assigning a priority to each order within the identified set of non-notifying orders based on a per-customer confidence level; exemplary means for assigning a highest priority to orders originated by new customers; exemplary means for assigning a second highest priority to orders originated by customers having consistent previous order pickup arrival times and a number of previous orders exceeding a threshold number of previous orders; exemplary means for assigning a lowest priority to orders in the set of non-notifying orders originated by customers having inconsistent previous order pickup arrival times; and exemplary means for generating a routing schedule for pre-staging the set of non-notifying orders based on assigned priority, pre-staging area space capacity, and bot capacity.

Other non-limiting examples provide one or more computer storage devices having a first computer-executable instructions stored thereon for providing non-notifying customer order management. When executed by a computer, the computer performs operations including identifying a set of non-notifying orders from a plurality of orders, wherein each order is associated with a set of totes storing a set of items within an automated storage device; assigning a priority to each order within the identified set of non-notifying orders based on a per-customer confidence level; and generating a routing schedule for pre-staging the set of non-notifying orders based on assigned priorities, pre-staging area space capacity, and bot capacity.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

In an exemplary embodiment, one or more of the exemplary embodiments include one or more localized Internet of Things (IoT) devices and controllers. As a result, in an exemplary embodiment, the localized IoT devices and controllers can perform most, if not all, of the computational load and associated monitoring and then later asynchronous uploading of summary data can be performed by a designated one of the IoT devices to a remote server. In this manner, the computational effort of the overall system can be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of summary data can include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI can be discarded depending upon the degree to which such KRI has any value based on local processing and evaluation of such KRI. In an exemplary embodiment, KRI may not even be utilized in any form if it is determined that KRI is transient and can be considered as signal noise. Furthermore, in an exemplary embodiment, the kernel rejects generic data to provide a modified kernel ("KRG") by filtering incoming raw data using a stochastic filter that thereby provides a predictive model of one or more future states of the system and can thereby filter out data that is not consistent with the modeled future states which can, for example, reflect generic background data. In an exemplary embodiment, KRG incrementally sequences all future undefined cached kernels of data to filter out data that can reflect generic background data. In an exemplary embodiment, KRG further incrementally sequences all future undefined cached kernels having encoded asynchronous data to filter out data that can reflect generic background data.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
    a memory;
    a processor communicatively coupled to the memory;
    an order manager component, executed by the processor, that:
        obtains online order history data via a network, the online order history data associated with a plurality of remote order pickup locations,
        analyzes the online order history data associated with individual users corresponding to each order in a plurality of pending orders at a local order pickup location,
        determines a set of non-notifying orders from the plurality of pending orders based on the analysis and using a dynamic threshold of previous orders, the dynamic threshold dynamically adjusted by a machine learning component based on the online order history data and real-time order pickup data received via the network,
        predicts an arrival time for an individual user associated with an individual order in the set of non-notifying orders based on online order history data;
        calculates a per-customer confidence level for the predicted arrival time using the online order history data and the dynamic threshold,
        assigns a per-order priority to each order within the set of non-notifying orders based at least in part on the calculated per-customer confidence level and the predicted arrival time, and
        generates, by the processor, a routing schedule for pre-staging the set of non-notifying orders based on the assigned per-order priority, pre-staging area space capacity, and bot capacity, the routing schedule including a set of pre-staging routing instructions for pre-staging each order in the set of non-notifying orders based on the predicted arrival time of the individual user,
        the order manager component sending, by the processor via the network, the generated routing schedule to an automated storage device at the local order pickup location, the automated storage device having a set of robotic devices, the set of robotic devices using the set of pre-staging routing instructions from the routing schedule to move totes storing items associated with a plurality of orders from a storage area to a pre-staging area within the automated storage device for user pickup at a dispensation area proximate to the pre-staging area.

2. The system of claim 1, wherein the order manager component is further executed by the processor to:
analyze the online order history data associated with a customer originating an order in the plurality of pending orders to determine whether the customer is a returning customer or a new customer, and assign a highest priority to orders originated by new customers when assigning the per-order priority to each order within the set of non-notifying orders.

3. The system of claim 1, wherein the predicted arrival time for the individual user is calculated using a number of previous orders and previous order pickup times for an individual user, the predicted arrival time weighted by the per-customer confidence level.

4. The system of claim 1, wherein the assigned per-order priority for the set of non-notifying orders is further used to prioritize order picking and order induction into the automated storage device.

5. The system of claim 1, wherein the order manager component is further executed by the processor to:
receive, from a customer device via a network, a customer check-in providing a customer-selected pickup time for an order in the set of non-notifying orders;
determine that the order is currently in the pre-staging area;
determine to move the order from the pre-staging area back to the storage area based on the customer-selected pickup time and cold-chain compliance rules;
generate new routing instructions for the order; and
send, by the processor via the network, the new routing instructions to the automated storage device at the local pickup location.

6. The system of claim 1, the order manager component is further executed by the processor to:
receive, from a customer device via a network, a customer check-in providing a customer-selected pickup time for an order in the set of non-notifying orders;
determine that the order is currently in the pre-staging area;
determine that a higher priority order is currently waiting for the pre-staging area space capacity;
generate new routing instructions for the order based on the customer-selected pickup time and the determined higher priority order; and
send, by the processor via the network, the new routing instructions to the automated storage device at the local pickup location.

7. The system of claim 1, wherein the set of robotic devices of the automated storage device include at least one robotic arm configured to move the totes within the automated storage device from the storage area to the pre-staging area.

8. The system of claim 1, wherein the storage area of the automated storage device comprises a plurality of slots for storing the totes.

9. The system of claim 1, wherein the online order history data identifies a number of previous orders made by a customer, whether the customer provided notification prior to arriving at an order pickup area to pickup a prior order in each of the number of previous orders, and a customer arrival time for each of the number of previous orders.

10. A computer-implemented method for managing non-notifying customer orders for pickup, the computer-implemented method comprising:
obtaining, by an order manager component executed by a processor, online order history data via a network, the online order history data associated with a plurality of remote order pickup locations;
analyzing, by the processor, the online order history data associated with individual users corresponding to each order in a plurality of pending orders at a local order pickup location;
determining, by the processor, a set of non-notifying orders from the plurality of pending orders based on the analysis and using a dynamic threshold of previous orders, the dynamic threshold adjusted based on online order history data and real-time order pickup data received via the network;
calculating, by the processor, a per-customer confidence level using the online order history data associated with the individual users corresponding to the set of non-notifying orders, the per-customer confidence level based at least in part on a predicted arrival time for an individual user;
assigning, by the processor, a per-order priority to each order within the set of non-notifying orders based on the calculated per-customer confidence level; and
generating, by the processor, a routing schedule for pre-staging the set of non-notifying orders based on the assigned per-order priorities, pre-staging area space capacity, and bot capacity, the routing schedule including a set of pre-staging routing instructions for pre-staging each order in the set of non-notifying orders based on the predicted arrival time of the individual user,
the order manager component sending, by the processor via the network, the generated routing schedule to an automated storage device at the local order pickup location, the automated storage device having a set of robotic devices, the set of robotic devices using the set of pre-staging routing instructions from the routing schedule to move totes storing items associated with a plurality of orders from a storage area to a pre-staging area within the automated storage device for user pickup at a dispensation area proximate to the pre-staging area.

11. The computer-implemented method of claim 10, further comprising:
calculating, by the processor, the predicted arrival time for the individual user based on a number of previous orders and previous order pickup times, the predicted arrival time weighted by the per-customer confidence level.

12. The computer-implemented method of claim 10, further comprising:
analyzing, by the processor, the online order history data associated with a customer originating an order in the plurality of pending orders to determine whether the customer is a returning customer or a new customer; and
assigning, by the processor, a higher priority to the order based on a determination that the customer is a new customer.

13. The computer-implemented method of claim 10, further comprising:

assigning, by the processor, a lowest priority to an order in the set of non-notifying orders originated by a returning customer having inconsistent previous order pickup arrival times.

14. The computer-implemented method of claim 10, further comprising:
receiving, by the processor from a customer device via a network, a customer check-in providing a customer-selected pickup time for an order in the set of non-notifying orders;
determining, by the processor, that the order is currently in the pre-staging area;
determining, by the processor, to move the order from the pre-staging area back to the storage area based on the customer-selected pickup time and cold-chain compliance rules;
generating, by the processor, new routing instructions for the order; and
sending, by the processor via the network, the new routing instructions to the automated storage device at the local pickup location.

15. The computer-implemented method of claim 10, further comprising:
receiving, by the processor from a customer device via a network, a customer check-in providing a customer-selected pickup time for an order in the set of non-notifying orders;
determining, by the processor, that the order is currently in the pre-staging area;
determining, by the processor, that a higher priority order is currently waiting for the pre-staging area space capacity;
generating, by the processor, new routing instructions for the order based on the customer-selected pickup time and the determined higher priority order; and
sending, by the processor via the network, the new routing instructions to the automated storage device at the local pickup location.

16. The computer-implemented method of claim 10, wherein the assigned per-order priority for the set of non-notifying orders is further used to prioritize order picking and order induction into the automated storage device.

17. The computer-implemented method of claim 10, wherein the online order history data identifies a number of previous orders made by a customer, whether the customer provided notification prior to arriving at an order pickup area to pickup a prior order in each of the number of previous orders, and a customer arrival time for each of the number of previous orders.

18. One or more computer storage media, having computer-executable instructions for managing non-notifying customer orders that, when executed by a computer cause the computer to perform operations comprising:
obtaining, by an order manager component executed by a processor, online order history data via a network, the online order history data associated with a plurality of remote order pickup locations;
analyzing, by the processor, the online order history data associated with individual users corresponding to each order in a plurality of pending orders at a local order pickup location;
determining, by the processor, a set of non-notifying orders from the plurality of pending orders based on the analysis and using a dynamic threshold of previous orders, the dynamic threshold adjusted based on online order history data and real-time order pickup data received via the network;
calculating, by the processor, a per-customer confidence level using the online order history data associated with the individual users corresponding to the set of non-notifying orders, the per-customer confidence level based at least in part on a predicted arrival time for an individual user;
assigning, by the processor, a per-order priority to each order within the set of non-notifying orders based on the calculated per-customer confidence level; and
generating, by the processor, a routing schedule for pre-staging the set of non-notifying orders based on the assigned per-order priority, pre-staging area space capacity, and bot capacity, the routing schedule including a set of pre-staging routing instructions for pre-staging each order in the set of non-notifying orders based on the predicted arrival time of the individual user,
the order manager component sending, by the processor via the network, the generated routing schedule to an automated storage device at the local order pickup location, the automated storage device having a set of robotic devices, the set of robotic devices using the set of pre-staging routing instructions from the routing schedule to move totes storing items associated with a plurality of orders from a storage area to a pre-staging area within the automated storage device for user pickup at a dispensation area proximate to the pre-staging area.

19. The one or more computer storage media of claim 18 further comprising computer-executable instructions that cause the computer to perform operations comprising:
receiving, by a processor from a customer device via a network, a customer check-in providing a customer-selected pickup time for an order in the set of non-notifying orders;
determining, by the processor, that the order is currently in the pre-staging area;
determining, by the processor, to move the order from the pre-staging area back to the storage area based on the customer-selected pickup time and cold-chain compliance rules;
generating, by the processor, new routing instructions for the order; and
sending, by the processor via the network, the new routing instructions to the automated storage device at the local pickup location.

20. The one or more computer storage media of claim 18 further comprising computer-executable instructions that cause the computer to perform operations comprising:
receiving, by a processor from a customer device via a network, a customer check-in providing a customer-selected pickup time for an order in the set of non-notifying orders;
determining, by the processor, that the order is currently in the pre-staging area;
determining, by the processor, that a higher priority order is currently waiting for the pre-staging area space capacity;
generating, by the processor, new routing instructions for the order based on the customer-selected pickup time and the determined higher priority order; and
sending, by the processor via the network, the new routing instructions to the automated storage device at the local pickup location.

* * * * *